United States Patent [19]

Jeter

[11] Patent Number: 4,825,421
[45] Date of Patent: Apr. 25, 1989

[54] SIGNAL PRESSURE PULSE GENERATOR

[76] Inventor: John D. Jeter, 1403 Teche Dr., St. Martinville, La. 70582

[21] Appl. No.: 865,083

[22] Filed: May 19, 1986

[51] Int. Cl.⁴ .............................................. G01V 1/40
[52] U.S. Cl. ...................................... 367/83; 340/861
[58] Field of Search ........................ 367/80, 81, 82, 83, 367/84, 85; 340/853, 861; 175/40, 45; 73/151

[56] References Cited

U.S. PATENT DOCUMENTS

| | | | |
|---|---|---|---|
| 3,065,416 | 11/1962 | Jeter | 340/18 LD |
| 3,737,843 | 6/1973 | Le Peuvedic et al. | 340/18 NC |
| 3,756,076 | 9/1973 | Quichaud et al. | 73/151 |
| 3,958,217 | 5/1976 | Spinnler | 340/18 LD |
| 3,983,948 | 10/1976 | Jeter | 175/45 |
| 4,120,097 | 10/1978 | Jeter | 175/45 |
| 4,386,422 | 5/1983 | Mumby et al. | 175/40 |

Primary Examiner—Brian S. Steinberger
Attorney, Agent, or Firm—John D. Jeter

[57] ABSTRACT

A mechanical oscillator driven by drilling fluid flow pumped down a drill string bore is combined with sensors and controls to produce a downhole drilling fluid pressure pulse generator for use in drill strings for Measurement While Drilling (MWD) pipe bore telemetry.

A fluid flow responsive valve designed to be put in continual motion by fluid flow is associated with a motion stop lock so that, on release, a discrete digital fluid pressure change is generated. A downhole instrument package controls the lock release in a timed sequence, so that a series of pressure changes represent information to be decoded at the earth surface to determine downhole parameters sensed by the instrument package.

The active elements of the downhole system may be installed in the drill string or lowered as a shuttle package down the drill bore.

The fluid pressure pulse generating apparatus can be classified as a fluid flow excited oscillator or an autocycling pulse generator.

Controls are provided to enable the auto-cycling valve to respond to electric signals from downhole instruments to generate code messages by digital pulse, change-of-state in valved flow resistance and frequency change in standing wave pressure pulses.

23 Claims, 6 Drawing Sheets

FIG. 6
FIG. 7
FIG. 8
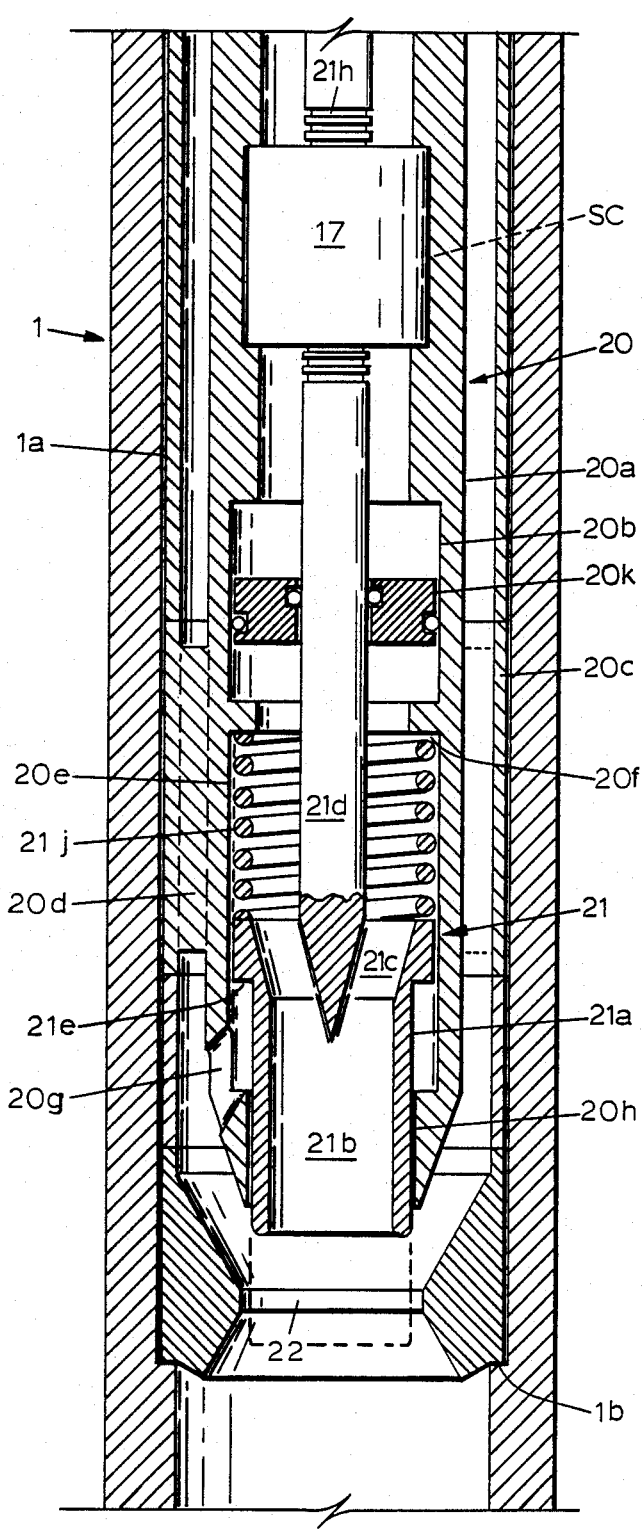
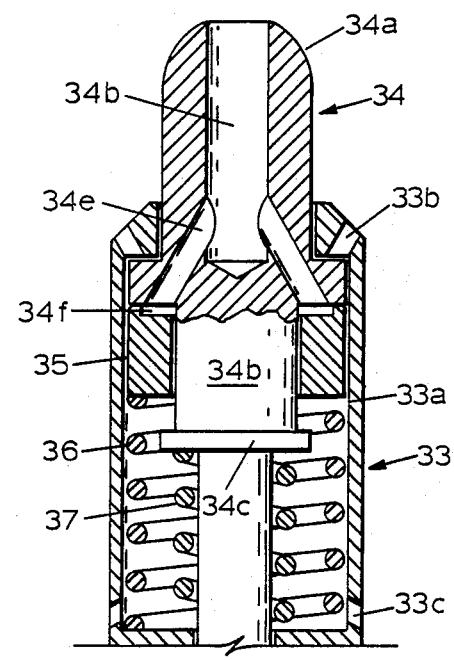
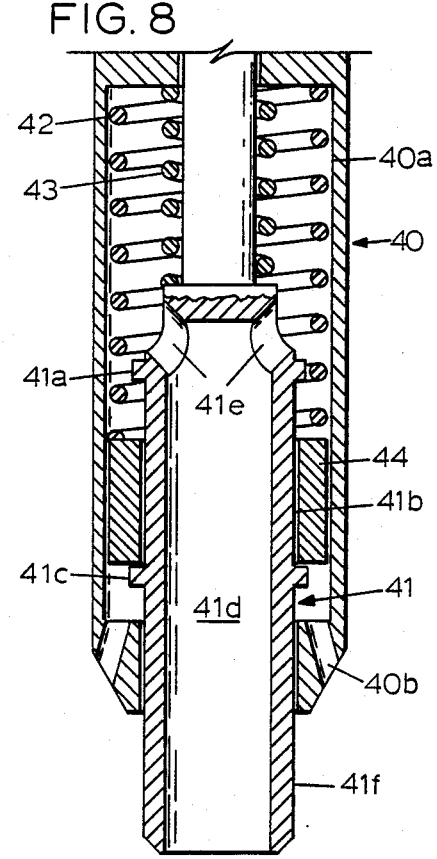

SIGNAL PRESSURE PULSE GENERATOR

FIELD OF UTILIZATION

This invention pertains to the generation of fluid pressure pulses in fluid pumped down drill strings in well drilling practices for borehole telemetry purposes. The practice is referred to generally as "measurement while drilling." More specifically, the invention relates to apparatus for the generation of pressure pulses in response to sensors and control instruments downhole.

RELATED ART

In current use are digital pressure pulse generators taught by the following U.S. Pat. Nos.:
  (1) 3,065,416: November, 1962
  (2) 3,737,843: July, 1973
  (3) 3,756,076: September, 1973
  (4) 3,958,217: May, 1976
  (5) 3,983,948: October, 1976
  (6) 4,120,097: October, 1978
  (7) 4,386,422: May, 1983

BACKGROUND OF THE INVENTION

Rotary well drilling practices include the use of drill strings with drilling fluid pumped down the drill string bore. On long drill strings, communication with the downhole system from the earth surface is difficult, because electric conductors are hard to install and maintain while drilling is in progress.

In recent years, it has become common practice to measure downhole parameters of interest with sensors and convert the resulting information into electric signals, convert the signals to drilling fluid pressure pulses in the drilling fluid in the pipe string bore, and to detect and decode the pressure pulses at the earth surface to recover the information transmitted.

The downhole apparatus that responds to electric signals and generates pressure pulses has been troublesome. Electric power has been used to operate solenoids to operate valves to generate drilling fluid pressure pulses. The generation of electric power has been a problem, and the valve operating gear has been costly and prone to failure.

Apparatus is needed that will cause cyclic pressure changes in the drilling fluid stream, unless action is taken to stop the pulse generating apparatus. Hardware needed to stop a self-excited pulse generator can be much simpler and consume less electric power than hardware required to cause and control pulse generation.

My U.S. Pat. No. 4,120,097, issued Oct. 17, 1978, discloses an unstable oscillator system powered by drilling fluid to create fluid pressure pulses in the drilling fluid stream without electric downhole systems to regulate the valve. The main fluid stream valve is controlled by related machinery to cause continual oscillation at a rate determined by the position of a cooperating sensor. A servo-valve is controlled by a dashpot to time the system. The overall system auto-cycles much the same as such machinery as steam engines. Unlike the present invention, the main stream valve will not oscillate, or auto-cycle, due to stimulus of flow of the controlled fluid stream.

OBJECTS

It is therefore an object of this invention to provide apparatus that is self-exciting and self energizing to generate drilling fluid pressure pulses in drill strings at a downhole location for communication purposes.

It is another object of this invention to provide apparatus to control a self-exciting and self-energizing mechanical oscillator downhole on drill strings to cause, by selective exercising of such controls, the generation of fluid pressure changes of time distributed patterns to transmit encoded information through a drill string bore.

It is yet another object of this invention to provide controlled, self-excited and self-energized fluid pressure pulse generators that can be packaged in shuttle form to be lowered to a downhole location through a drill string bore.

It is still another object of this invention to provide apparatus that will cooperate with the inertia of a fluid stream, and the elasticity of the fluid stream and confining drill string, to accomplish the effect of an oscillator that will generate a standing pressure variation wave form continuously until controlled, as long as fluid is pumped down the drill string.

It is yet a further object of this invention to provide apparatus to force the mechanical oscillator to function on fluid flow surface tests, and when the long drill string with fluid flow inertia and elasticity is not adequate to cooperate in creating the self-exciting cooperation of the mechanical assembly to be eventually used downhole.

It is still another object of this invention to provide apparatus to cooperate with reciprocating action of downhole mechanical oscillators to generate electric energy for the downhole apparatus and to regulate standing wave frequency modulation.

It is yet a further object of this invention to provide apparatus to control a mechanical oscillator such that oscillating motion may be stopped at zero velocity to conserve stored energy in naturally oscillating elements and to reduce shock to controlled and controlling elements.

It is still another object of this invention to provide control means to cause an auto-cycling, or resonating, pulse generating valve to function such that a variety of encoding systems can be used selectively by downhole signal processors.

These and other objects, advantages, and features of this invention will be apparent to those skilled in the art from a consideration of this specification, including the attached drawings and appended claims.

SUMMARY OF THE INVENTION

A downhole self-excited auto-cycling mechanical oscillator is combined with a selective control to respond to downhole parameter sensors and encoder to generate a controlled time distributed sequence of pressure changes in a drilling fluid stream flowing down the bore of a drill string to transmit information along the drill string bore to the earth surface while drilling.

The oscillator preferred embodiment is in effect a flow resistance valve designed to cooperate with the flowing drilling fluid to chatter, resonate or oscillate between conditions of more resistance and less resistance to fluid flow to, potentially, create a continuous pressure variance wave form approximating a sine wave.

Encoding can be by digital pulse, change-of-state, and standing wave frequency manipulation. To deliver a digital pulse the flow resistance means is stopped at the low resistance point for any integral number of sine wave cycles. To deliver change-of-state, the flow resistance means having been stopped at either the low or high flow resistance point is released to move to the alternate stopping point. To accomplish frequency manipulation, the auto-cycling flow resistance means is allowed to oscillate with one or more cycles slowed down below the natural cyclic period. There are three frequency control options. A linear electric generator output can be controlled to extract energy on a cycle-by-cycle basis, to alter each cyclic period. An internal oil flow variable damper can be used to influence the time period of each cycle, and the axial position locks can be exercised to positively control the time interval between change-of-state, such that an altered standing wave is generated.

A further alternative is to lock the oscillator moving element in either the most open or most closed position of zero velocity. This permits change-of-state encoding to effectively double the data rate.

Provisions are additionally made, optionally, to use the linear motion of the oscillator to generate electrical energy downhole for use of control instrumentation.

Disclosed also are provisions to install the apparatus in the drill string or to package it as a shuttle assembly to be lowered to the downhole location through the drill string bore.

ENCODING PRACTICES

Pressure pulse generators are commonly means to change the resistance to the flow of drilling fluid down the drill string bore to produce pressure changes detectable at the earth surface. Early well bore communication practices involved time distributed digital pulses devised to transmit binary code. A digital pulse changes flow resistance briefly and returns to the original state. If the downhole apparatus could deliver, say, one pulse per second, the message could be divided into one second increments. A pulse at a particular interval could represent a zero, and that interval without a pulse could represent a one.

With a number of options available over a selected time period for a message to be encoded, the various combinations possible may contain more message options than the binary code could transmit. Solid state signal processors usable downhole now make combination encoding attractive.

By using flow resistance change apparatus downhole that can retain a selected flow resistance, change-of-state encoding is possible. One state may be wide open, and a second state may have a flow resistance producing in the order of a 100 psi pressure differential over the signal valve. Change-of-state may produce more data bits per second than digital pulses, because a pulse is two changes of state. With change-of-state either binary or combination encoding, or other coding systems may be used.

High speed signal valves that can produce pulses or change-of-state can usually produce standing pressure waves ideally resembling sine waves. If standing wave frequency can readily be controlled, encoding by phase shift and frequency modulation becomes practical.

Phase shift encoding usually requires several cycles to detect at the earth surface. Only limited frequency ranges transmit well in drill strings, and any cycles invested in detecting one data bit will reduce the message delivery rate. The ability to shift phase implies the ability to modulate frequency, and frequency modulation offers advantages.

Apparatus of this invention responds to electrical signals, and any methods for formulating codes in a time distributed manner may be used if compatible with the apparatus. The apparatus will be referred to as a pulser but produces flow resistance changes in a rapid sequence if uninhibited. The ability to inhibit change for any selected period of time, within the signal response time of the apparatus, permits encoding in many formats by digital pulses, change of state, phase shift of standing waves, and frequency modulation of standing waves, or any combination. Since no change is required in the apparatus to change the manner of encoding, for instance, an interval of frequency modulation can be directly preceded by a sequence of digital pulses and followed by a change-of-state sequence in a single encoded message.

BRIEF DESCRIPTION OF DRAWINGS

In the drawings, wherein like reference characters are used throughout to designate like parts:

FIG. 6 is a side view, partially cutaway, showing the operating mechanism for the preferred inverted pulser in accordance with the format of FIG. 2 and FIG. 3;

FIG. 7 is a side view, partially cutaway, showing a modification of the pulser of FIG. 4 to force auto-cycling;

FIG. 8 is a side view, partially cutaway, showing a modification of the pulser of FIG. 6 to force auto-cycling;

DETAILED DESCRIPTION OF DRAWINGS

Many features of construction, assembly, and maintenance utility such as threads are omitted, if not pertinent to points of nevelty, to more clearly illustrate functional aspects of the apparatus.

Figure 1:
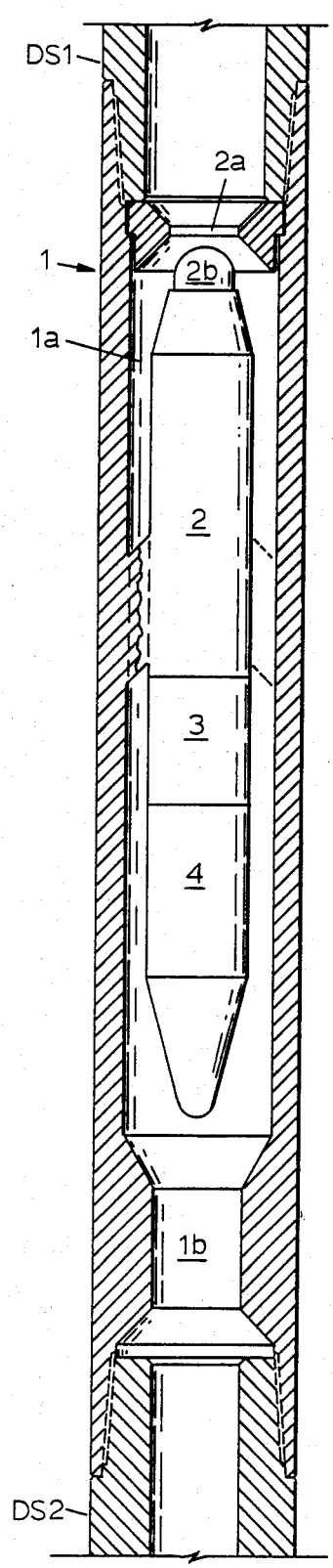
FIG. 1 is a side view, partially cutaway, showing a pulser package in the usual relationship with a drill string.
Figure 2:
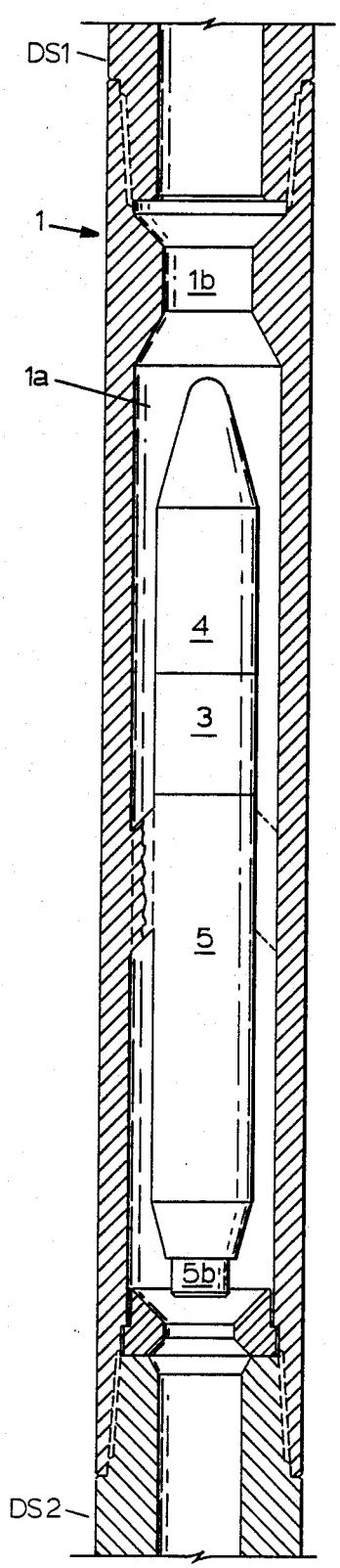
FIG. 2 is a side view, partially cutaway, showing an inverted pulser suspended in a drill string and its relationship to an orifice.
Figure 3:
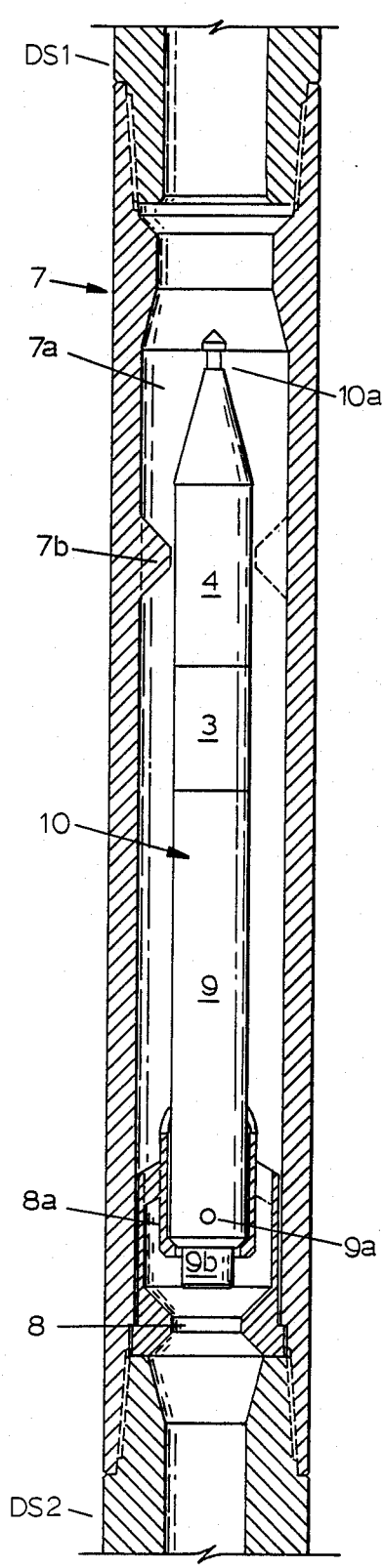
FIG. 3 is a side view, partially cutaway, showing a pulser in a shuttle assembly in a drill string utilizing an inverted pulser.

FIGS. 1, 2, and 3 describe the general arrangement of drill strings and the relationship of fluid flow resistance change signal systems to the drill string bore, and drilling fluid streams. Subsequent figures may pertain to the signal generators only, and the overall structure will not, in each case, be redrawn.

In FIG. 1, an upwardly continuing drill string DS1 is threadedly attached at the top to body 1. This is a fluid tight tool joint connection. Body 1 is a drill string element with bore 1a adapted to mount pulser 2 securely to the body, the mounting details to be subsequently shown. An orifice 2a is also mounted in the bore 1a, so positioned that the pulser poppet 2b can move axially to inhibit flow of fluid therethrough.

Body bore 1b is commonly reduced in diameter from bore 1a and leads to tool joint connections for fluid tight attachment to a downwardly continuing drill string DS2.

Fluid is pumped down the drill string bore from the earth surface and flows through orifice 2a, around pulser 2, into bore 1b, and into the downwardly continuing drill string DS2.

Though not a point of novelty in this invention, but of necessity usually mounted with the pulser, sensor package 4 and signal processor package 3 are part of the overall bore suspended assembly. The sensors detect parameters of interest downhole such as pressure, temperature, and earth azlmuth relationship to some reference on the downhole assembly and angle off vertical of the drill string centerline. Some sensors may be in the drill string wall and wired to the package shown.

Sensors, signal conditioners, encoders, and related power supplies are commonly purchased packages provided by specialty organizations for manufacturers of downhole signal generators. They are usually referred to as "downhole instruments".

FIG. 2 discloses a mud flow restricting signal valve that is upside down when compared with conventional signal valves. One advantage of this arrangement is the absence of moving valve elements exposed to the turbulence of the valve exit velocity.

The body of FIG. 2 can be exactly like the body of FIG. 1 but inverted, and pulser 5 is supported in bore 1a. The orifice 5a is again secured to the body and cooperates with poppet 5b to restrict fluid flow.

FIG. 3 represents a different body bore configuration in a body associated with a drill string as described for FIG. 1. The pulser 9 is part of a shuttle assembly 10 that can travel down the drill string bore to land on a support 8a. Support 8a is a tube having a bore restriction through which the shuttle body will not pass. Support 8a is connected to the orifice structure with fins which allow mud to flow downward.

Poppet 9b extends downward through the support, called a baffle, and reciprocates axially to accomplish variable flow resistance in cooperation with orifice 8.

The long shuttle commonly contains sensor package 4 and signal processor package 3 and needs some form of radial stabilization. Fins 7b are shown to be part of the body extending radially into body bore 7a to approach the shuttle outer surface.

The shuttle assembly is rarely dropped down a drill string bore. It is lowered into the bore by a wire line which engages the overshot spear atop terminal 10a. This handling of shuttle assemblies is commonly practiced.

Baffle 8a can comprise a muleshoe which engages a pin 9a on the shuttle assembly to rotationally orient the shuttle relative to the drill string. The muleshoe and pin arrangement is well established in the art and is not shown in detail.

Flow control valve details to follow are called pulsers, because they are inherently auto-cycling and will oscillate and cause fluid pressure pulses, as long as fluid flows, unless they are inhibited. To best understand these valves, it is best now to describe FIGS. 11A, B, and C.

Figure 11A:
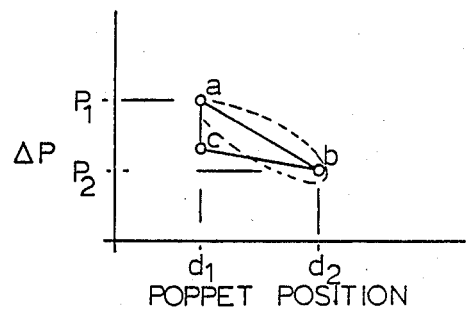
FIGS. 11A, 11B, and 11C are graphic presentations of the physical factors contributing to the ability of reciprocating pulser valves to continually auto-cycle in cooperation with fluid flow.

FIG. 11A applies to the common relief valve used to limit pressure in a common hydraulic fluid body. The abscissa represents dimension traversed by the valve poppet from the cooperating seat. The ordinate represents pressure being controlled by the relief valve. At point a the valve senses excess pressure P1 and moves from closed at dimension d1 to open at d2, while the pressure at the seat orifice is reduced, as intended, to P2. Assuming the excess pressure is transient, the poppet reverses at some point b and approaches the orifice when pressure is reduced. At point c, the valve closes and pressure grows some above P2 as flow loss is reduced.

If the valve has considerable poppet mass, it moves open more slowly from point a, overshoots point b, causing more system pressure loss than bias alone would have permitted, and finally returns to the seat at d1. This travel is noted by dashed lines. altered, and the poppet can enter the seat bore. The resulting leakage is acceptable and not germane. Excursion of the poppet, made deliberately heavy, will at some time begin at point a, at d1, and move open, overshooting d2, finally reverses direction under bias force, and approaches d1. There is no seat to hit, and the mass of the poppet will overshoot d1, injecting the poppet some distance into the seat orifice. The spring of finite spring rate will have less closing force than it had at point a and d1, and motion reverses and the poppet begins to move toward dimension d1. The single cycle describes the onset of instability. If the upstream system has a constant input, the fluid pressure will increase above P1 while the valve overshoots d1.

When the poppet mass is free to move without interruption, is urged by a force in one direction and biased by means having a finite "spring rate" in the opposite direction, the poppet will freely oscillate between two points of movement reversal. This is one of many forms of resonant systems. Such resonant systems can be restrained at either point of movement reversal, where the poppet has no velocity, for any length of time and, when released, the system will continue to oscillate with the periodic cycle rate unchanged. A poppet biased upstream toward a fluid conducting orifice will be pushed away from the orifice and will oscillate at a resonant frequency, unless fluid damping or obstructions interfere, and comprise a simple resonant signal valve, subject to restraint at the points of poppet reversal for release therefrom to provide time distributions for signal encoding.

The present invention teaches several means to modify the resonant system to enhance the power made available by resonant action and to extract power from the system. The expression "auto-cycling" is therefore preferred in descriptive matter.

Because pressure operating on an area is proportional to force, and because a distance $d_2-d_1$, plus left and right overshot is distance, the area within the envelope E represents net energy. More energy is delivered to the poppet in opening the valve than in closing the valve, and a net gain in energy results. The amplitude of the poppet excursion, if unchecked, would grow until energy loss in dynamics of motion consumes the net gain in energy for each cycle. The conventional result is water hammer, and a phenomenon known as "chattering" in regulator and relief valves. Apparatus of this invention converts this normally undesirable phenomenon to useful purpose.

It is recognized that the unstable or auto-cycling valve can, under controlled laboratory conditions, be activated under very slowly increasing and very stable flow conditions, such that instability will not occur. Such conditions are rarely realized, even briefly, in practical circumstances—certainly never in drilling activity.

Figure 11B:
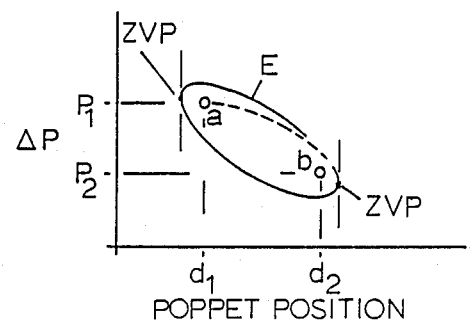
Figure 11C:
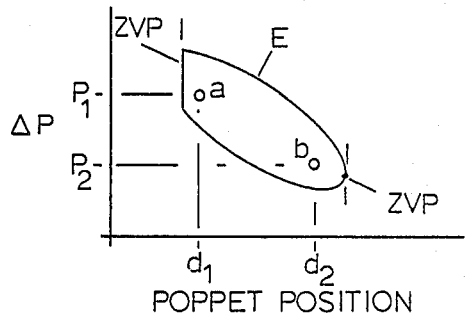

FIG. 11C applies to lost motion provision between a valve and valve operating means responsive to the valve differential pressure and operatively oriented to open the valve on differential pressure increase. Lost motion as will be described later, adds power to envelope E. The vertical line forming the left side of envelope E results from the poppet remaining still and building differential pressure while the pressure responsive element runs out the lost motion. There is very little vertical interval on the right side of envelope, because lost motion run out or recovered while the valve is open has little pressure influence.

For FIGS. 11B and 11C, there are zero velocity points, ZVP, at each left and right extreme of envelope E. At these poppet position points, the poppets are not moving. There is no kinetic energy, and no energy is lost from the poppet if it is locked for any length of time at either of these positions. Once released, the poppet proceeds with the next cycle as if no locking had occurred.

The two points of zero poppet velocity invites the use of the auto-cycling valve for change-of-state encoding. Both ideal locking points can be used. As stated, the poppet can enter the seat orifice and can be made substantially smaller than the orifice to reduce the pressure differentnal across the valve when locked in the most closed state.

The preferred embodiment of this invention will utilize the auto-cycling valve as a mainstream valve in the drill string to create positive pulses in the mud stream.

To create negative pulses in the mud stream, a valve to control by-pass from the drill string to the well annulus, by-passing fluid above drill bit nozzles and other fluid flow resistances, is a common practice. It is desirable, in such cases, to have a poppet and seal arrangement that is capable of stopping flow through the by-pass as long as the poppet is locked in the most closed position. The envelope E of FIG. 11B can be created by resiliently mounting a seat engaging poppet in a biased mass which moves in general sympathy with the poppet. The poppet will hit the seat at d1, but the resiliently related mass will override the poppet, reverse, and carry the poppet toward open with the kinetic energy of the mass. In such cases, the lock will engage the mass at its zero velocity points. The envelope of FIG. 11C applies for such valve arrangements.

It is well to keep in mind that, in drill strings with a long moving fluid column and powerful surface fluid pumps, the movement of fluid down the drill string is not stopped by main stream signal valves. The signal pulse is small compared with the fluid energy available.

Figure 4:
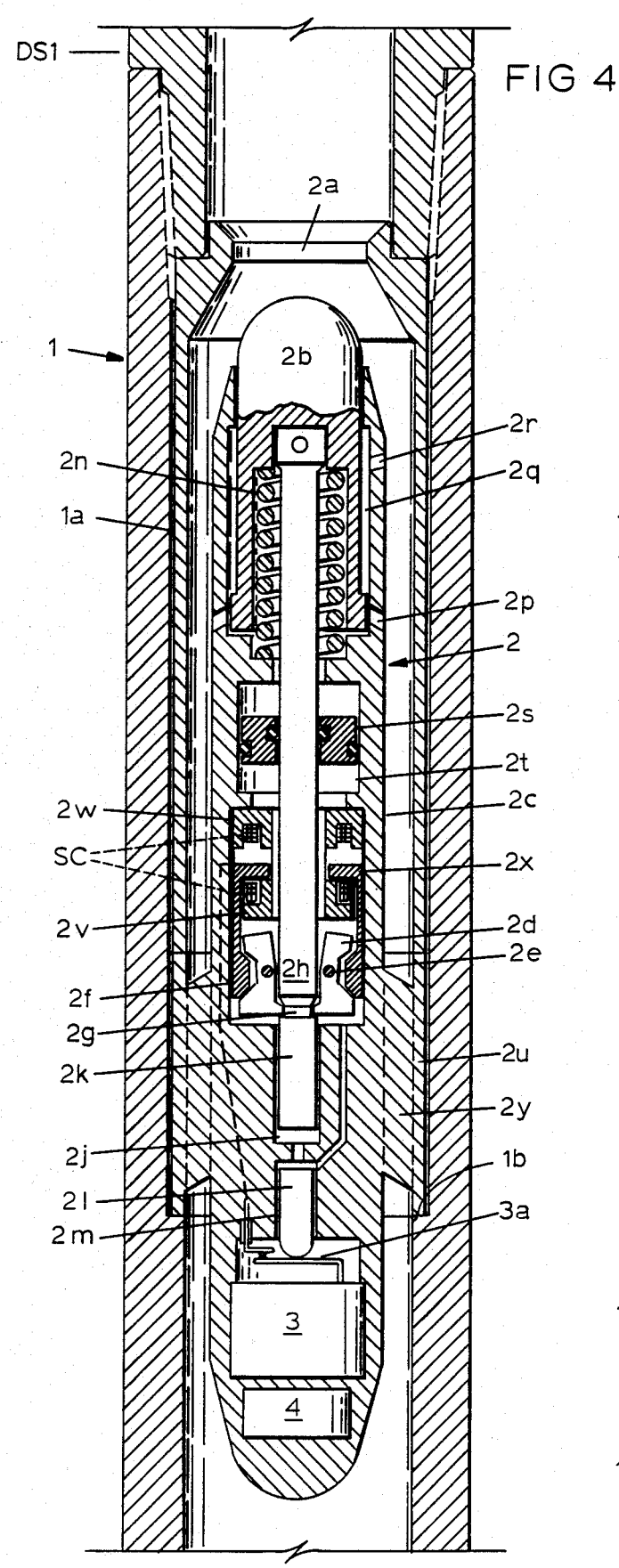
FIG. 4 is a side view, partially cutaway, showing an auto-cycling pulser valve assembly, with controls, in accordance with the format of FIG. 1.

FIG. 4 represents the pulser shown in FIG. 1 and pulser 2, poppet 2b, orifice 2a, sensor package 4, signal conditioner 3, and body 1 retain the original references. The orifice 2a is part of a compression sleeve stack, including housing sleeve 2u, which is held down against shoulder 1b by the tool joint pin of the upwardly continuing drill string. Sleeve and housing are joined by fins 2y.

Poppet 2b is in the most downward position, having been thrust down by a previous cycle and locked down by locks 2d. Lock elements 2d pivot on pins 2e, which are anchored in the housing structure to engage groove 2g in poppet control extension 2h. The locks 2d respond to solenoids 2v and 2w. The solenoids respond to signal processor 3 and move tangs 2f downward to lock, and move tangs 2f upward to unlock. The tangs 2f are attached to armature 2x. Once locked, the lock elements are self retaining because of the force angle between the pins 2e and groove 2g. The solenoids do not have to be actuated until there is a signal to unlock. The solenoid can be oriented by bias means (not shown) to lock automatically on every downstroke of the poppet. The bias means, if needed, is a spring washer inserted between armature 2x and solenoid 2w.

To lock the poppet only when it reaches zero velocity and reverses, switch 3a is in the signal processor-to-solenoid electric line. As poppet control extension 2k moves downward in bore 2j, fluid is expelled to the general enclosure through channels offering some flow resistance, and the resulting slight pressure moves piston 21 in bore 2m to open switch 3a. When the poppet reverses direction, the reverse flow of fluid into the bore 2j allows piston 21 to move upward under switch spring bias, and switch 3a closes. If a voltage has been made available by processor 3, the solenoid 2v will move tangs 2f downward, and the lock elements 2d will hold the poppet down. Switch 3a is a two-pole switch and will remain closed as long as the poppet is locked down. On cue from the processor 3, the solenoid 2w will move tangs 2f upward, unlocking the poppet to create another pulse. Electric lines are not shown in detail.

Poppet 2b is urged upward by spring 2n, and when unlocked will move upward into orifice 2a. The poppet can enter the bore of the orifice. With fluid moving downward through the drill string bore and orifice 2a, a pressure differential will develop across the orifice, and the poppet will be urged back downward. The drilling fluid and confining drill string is never a totally rigid system, and the pressure differential across the orifice increases while flow is impeded for a brief period while the poppet reverses direction.

Fluid flow changes some due to the fluid system resilience, and more fluid energy is applied to move the poppet downward than was available to retard the poppet upward movement. As previously described herein, there is a net gain in energy from the poppet excursion available to overcome friction losses, and the poppet is driven downward. The poppet would be driven downward below the starting point, but downward motion of the poppet forces displaced fluid out ports 2p. Ports 2p are somewhat above the bottom of recess 2q, and when the poppet lower skirt passes the ports, the dashpot effect decelerates the poppet to prevent shock.

Piston 2s in bore 2t is sealed against extension 2h and the bore wall. This is a floating isolator with drilling fluid above piston 2s and oil below. All machinery in the housing 2c below the piston 2s is oil immersed.

The descriptive matter for the apparatus of FIG. 1 pertains to the generation of a digital pulse comprising a full cycle of flow restriction for each actuating signal from processor 3. To use this system for change-of-stage from either the more open or more closed position of the poppet and orifice pair to the other position, a more elaborate locking system is required.

Figure 5:
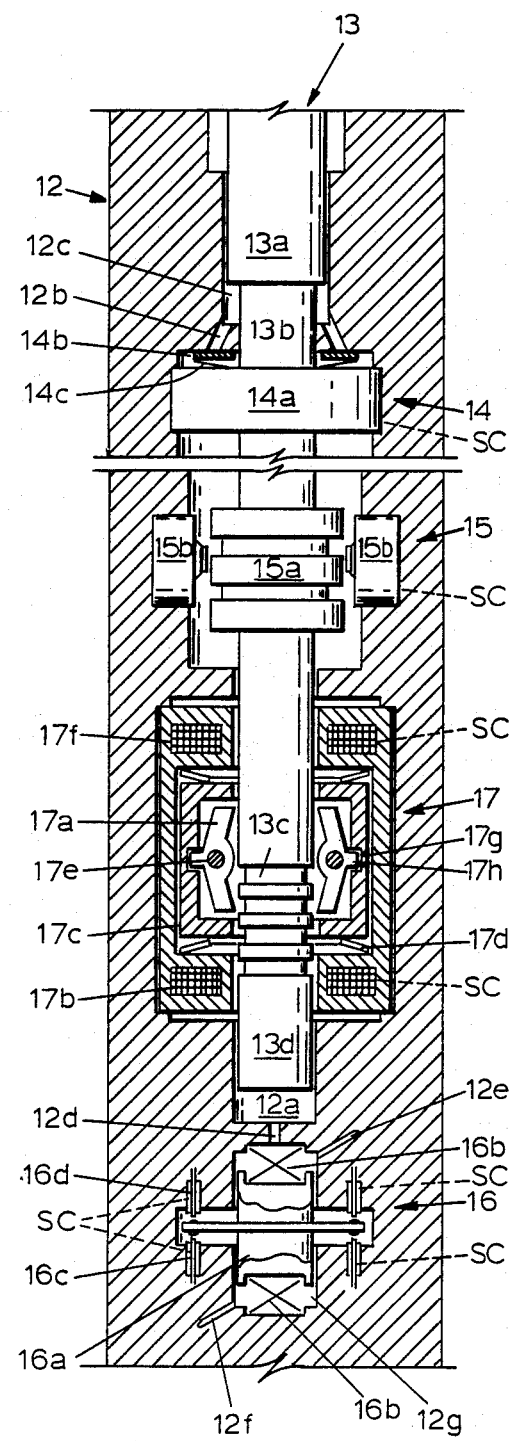
FIG. 5 is a side view, partially cutaway, showing the preferred locking and related machinery for any of the disclosed reciprocating pulsers.

FIG. 5 represents cycle control systems usable with all reciprocating pulser valves presented herein. The outer dimension of housing 12 corresponds to the outer dimension of housing 2c of pulser 2 of FIG. 4. The top of FIG. 5 begins below opening 2t and the lower end terminates just above processor 3 of FIG. 4. For use on pulsers of FIGS. 2 and 3, the apparatus of FIG. 5 is simply turned upside down.

Not shown are oil galleries that allow fluids to flow around machine elements and facilitates removal of air during assembly. Also not shown are wires and wiring chambers that contain wires to switches, solenoids, generator, and processor.

The apparatus of FIG. 5 can control a poppet to encode by digital pulse, by change-of-state, by phase shift and frequency modulation, and can change from one encoding scheme to the other as directed by the signal processor without altering any elements shown.

Poppet extension 13 is attached to a poppet as shown in FIG. 4 and can reciprocate axially. A plurality of lock grooves 13c permit locking at various axial positions, because very low fluid flow rates down the drill string will not produce maximum axial excursion of the poppet. Locking the poppet at zero velocity points perpetuates auto-cycling ability anyway, as previously described herein. The grooves 13c are situated relative to latch rockers 17a such that the poppet can be locked at the most upward zero velocity point or at the most downward zero velocity point.

As shown, assume the poppet extension 13 is moving downward but almost stopped before direction reversal. Fluid has been flowing from bore 12a, through channel 12d, and out channel 12e to the general enclosure, displaced by moving extension end 13d, and a pressure was sensed during downward motion by piston 16a, when fluid flowed to the general enclosure with some flow resistance. Piston 16a was moved down, closing switches 16c to indicate downward motion to the signal processor. Assuming the processor is going to hold the downward position when poppet velocity approaches zero, the opening of switches 16c will cause the processor to signal the solenoid 17 to lock in the downward position. Springs 16b center piston 16a when pressure displacing the piston drops away due to poppet motion ceasing and/or reversing direction. Fluid is vented through channel 12f. As shown, switches 16c have just opened. The processor will fire to energize coil 17b, pulling armature 17c downward, overcoming centering spring washer 17d and, by way of notch 17q and rocker arm 17h, will tilt latch rockers 17a into any groove 13c in registry. As soon as the poppet bias spring (not shown) urges extension 13 upward, the triangular force system imposed between the groove 13c, rocker 17a, and pin 17e will hold the rocker and groove engaged, and energy to coil 17b can be dropped. The spring 17d is not strong enough to unlock the rockers.

When the signal processor again demands upward movement of the poppet extension to change state, energy is applied directly to coil 17f, the switches are not involved. Armature 17c moves upward, rocking latches 17 out of grooves 13c, and extension 13 begins the upward excursion.

The coil 17f may be left energized during the upward excursion of extension 13. The upper ends of rockers 17a will drag on the extension and grooves 13c harmlessly until downward movement of the extension causes self holding of the rockers as previously described. The processor, however, will sense upward movement of the extension because of inflow of oil into bore 12a and consequent upward movement of piston 16a. Switches 16d, by closing, will indicate to the processor that upward motion is taking place. Once upward motion is sensed, voltage to coil 17f could be dropped until opening of switches 16d signals to the processor that upward velocity is approaching zero. If the upward position is to be held as dictated by code sequencing, coil 17f would again be energized, locking the upward position until time to release again is demanded to satisfy encoding.

Pole rings 15a attached to extension 13, and coils 15b attached to housing 12 comprise a linear motion electric generator 15. The drawing is more symbolic than specific, because there have been for many years several designs of such generators available. The moving parts are commonly permanent magnets or flux gates for permanent magnetic fields. The coils are commonly stationary to avoid brushes. Electric energy produced is conveyed by leads to the processor for battery charging under processor control.

Circuitry in the art can be used in processor 3 to control the electric energy from generator 15. This is a convenient way to modify the natural frequency of the auto-cycling fluid flow resistance valve driving extension 13 in reciprocation. This permits generator 15 and processor 3 to carry out limited frequency changes on a cycle-by-cycle basis, which is ideal for phase shift or frequency modulation encoding.

Solenoid 14a and valve armature 14b comprise the essence of a frequency control 14. On extension 13, region 13a and 13b have different diameters and function as an annular piston in bore 12c. During downward movement of extension 13, fluid is displaced from bore 12c through channels 12b into the general enclosure. Armature valve ring 14b is lightly spring loaded upward by spring washer 14c. When extension 13 begins upward motion, the ring 14b will cover channels 12b and slightly resist upward motion of the extension, as long as region 13a is in bore 12c. If a signal from the processor goes to solenoid 14a, armature valve ring 14b will be pulled down to open ports 12b, and the upward excursion of extension 13b will take place at system capability. This enables the processor to leave lock system 17 inactive and transmit a series of fluid pressure pulses in the mud stream at normal system frequency, then to shift phase by retarding one or more cycles of a series.

By selectively exercising the features of FIG. 5 as described herein, a signal processor can control an auto-cycling mud stream valve to signal by phase shift, by frequency modulation, time spaced digital pulses and by time spaced change-of-state. Additionally, the unlocked pulser, capable of auto-cycling, can run free to charge batteries until energy available enables the signal processor to take control of the mud pressure signal generator.

FIG. 6 illustrates a drilling fluid flow pulser valve functionally similar to that of FIG. 4 and shown related to a drill string in FIG. 2. The poppet is above or upstream of the cooperating orifice in the manner of a check valve. The poppet has piston surfaces that respond to increasing pressure differential produced by the valve (poppet and orifice pair) to urge the valve to open. By turning the valve upside down the usual silting problem of apparatus used in drilling mud is avoided. Silt is comprised of higher density mud solids settling into quiescent areas of machinery. With the valve upside down, silt falls out. Additionally, drilling fluids coming out of partially closed valves usually find some surface to abrade away. With the arrangement of FIG. 6, only the essential surfaces are below the orifice, and maximum opportunity for velocity diffusion is afforded.

Control lock system 17 has been explained for FIG. 5 and is mounted in housing 20a upside down. Lock system 17 controls the axial movement of poppet extension 21d by engaging any of lock grooves 21h, as was explained for grooves 13c of FIG. 5.

Poppet 21a moves axially, is at an upward position, and being urged downward by spring 21j. Spring and poppet are guided by bore 20e. Spring 21j bears on shoulder 20f and on top of the poppet. Fluid pressure is conducted through bore 21b and channels 21c into bore 20e. The top of the poppet is larger than the lower end and is exposed to the pressure available to bore 20b. Annular piston area 21e is exposed to pressure of fluid conducted through ports 20g, which open above the orifice. When lock 17 releases grooves 21h on signal from the signal processor (not shown), poppet extension 21d and poppet 21a move downward to approach orifice 22. The poppet may enter orifice 22 at low drilling fluid flow rates, but may stop short of entry at high flow rates. As pressure differential develops across the obstructed orifice, bore 21b is exposed to lower downstream pressure, and port 20g is exposed to higher upstream pressure.

The annular area 21e experiences the pressure differential, higher below and lower above. A net lift results at some preselected pressure differential across orifice 22, and the poppet stops downward motion; and if not locked in that position by lock 17, will begin an upstroke. As previously explained herein, the poppet, if uninhibited, will auto-cycle between up and down positions.

There is no fundamental difference between the poppet and orifice pair of FIG. 6 and that of FIG. 4 relative to auto-cycling, and that feature has been described herein.

Housing 20a is supported by fins 20d extending to compression sleeve 20c. Sleeve 20c is part of a compression stack secured in bore 1a by downward load against shoulder 1b as described for FIG. 4.

Isolator piston 20k is sealed to bore 20b, and extension 21d can move axially and separates mud below from oil above. Pressure is about the same on both sides of piston 20k.

All features of FIG. 5 can optionally be associated with extension 21d as previously described herein.

The sturcture of FIG. 6, made free of fins 20d, can obviously be part of the shuttle package of FIG. 3. Inside the enclosure of the shuttle the machinery is merely of smaller scale compared with the systems installed in the drill string structure. To serve as part of a shuttle package, the housing 20a will be shaped at the lower end, below ports 20g to fit and be supported by the bore of baffle 8a of FIG. 3.

Referring briefly to FIG. 3, the principal adaptation required of shuttle pulser packages is one of fitting the shuttle lower end to a particular drill string. The variations required pertain to drilling fluid flow rate accommodations. Low flow rates may be 125 gallons per minute, and high flow rates may exceed 1,200 gallons per minute. Large flow rates are usually pumped through drill strings with large bore dimensions, but there are usually various bore restrictions which are not correspondingly large. The shuttle must be small enough to pass through the smallest bore restriction. The poppet that the shuttle can carry is too small to cooperate with an orifice large enough to accommodate the greatest flow rates.

For low flow rates, there is advantage in putting the cooperating orifice in the shuttle body to allow that expendable part to be recovered by wire line along with the shuttle. The arrangement of FIG. 3 is typical of a shuttle for mid range flow rates. With mid range flow rates, the shuttle poppet may be about one and three-fourths inches in diameter cooperating with an orifice of two inch diameter to accept a flow rate of 400 gpm. This size ratio, at that flow, will still yield enough pressure change to represent a detectable pulse or change of state.

FIGS. 7 and 8 disclose means to delay the response of the fluid flow resistance valves actuating means to the differential pressure produced by the valve. The poppet is biased toward valve closure and normally responds to the resulting differential pressure and moves toward the more open state at preselected pressure differentials. As previously explained herein, fluid inertia and upstream resilience in the fluid system provide delay in fluid pressure development, after valved flow resistance increases. To add power to the auto-cycling valve, the features disclosed in FIGS. 7 and 8 add delay to valve elements as well.

Various options disclosed herein, such as generator and frequency modulation controls, extract power from the poppet. The added feature can be defined as a lost motion contrivance in that the piston that responds to valve differential pressure can move some distance before forcing the valve poppet to move toward a lower flow resistance state. This introduces a forced response error, which the valve must move constantly to correct. The result is forced auto-cycling of the valve having the ability to produce additional power in the auto-cycling process.

In FIG. 7, poppet 34 would replace poppet 2b of FIG. 4. Housing 33 may be identical to housing 2c, bore 33a may be identical to bore 2q; all of FIG. 1. All machine elements of FIG. 7 can fit into the unmodified enclosure of FIG. 4, and poppet controls of FIG. 4 or FIG. 5 may be used directly with the continuance of FIG. 7.

When poppet extension 34a approaches a cooperating orifice, the flow being downward, upstream pressure enters opening 34b, is conducted through channels 34e, and exits in region 34f between poppet 34 and free piston 35. The effective piston area exposed to pressure in region 34f exceeds the effective piston area of extension 34a, and the poppet is urged upward into the cooperating orifice.

Fluid pressure downstream of the cooperating orifice enters ports 33b and 33c to exist in chamber 33a. Piston 35 is urged downward by the greater pressure in region 34f, overcoming upward bias of spring 36. The poppet is biased upward by spring 37 to oppose impulse loading on the poppet by fluid flowing downward around the poppet extension. Until piston 35 hits abutting shoulder 34c, the poppet does not begin downward motion and allows a build-up of differential pressure across the cooperating orifice. When the piston 35 hits shoulder 34c, the pressure in region 34f no longer influences either piston or poppet, and the poppet begins downward motion accelerated by the fluid pressure differential and the inertia.

Once the pressure differential is reduced, piston 35 reverses direction and moves relative to the poppet until it engages the poppet at region 34f. Both piston and poppet move upward to repeat the cycle.

The arrangement of locks and such as those of FIG. 5 control the poppet and overall behavior is otherwise the same as described for FIGS. 4 and 5. Use of the arrangement of FIG. 7 only slightly changes the shape of a standing pressure wave form and is not found deterimental to the signal function.

The elements of FIG. 8 fit directly into enclosure 20 of FIG. 6, and all description of functions for FIG. 6 apply concerning locks and the cooperating orifice. As shown in FIG. 8, the poppet 41 is approaching the lower limit of travel on the downstroke. Pressure downstream of the cooperating orifice is conducted through bore 41d and channels 41e into bore 40a.

The annular piston 44 is free to slide on poppet midsection 41b between abutting shoulders 41c and 41a. Compression spring 42 bears on the piston and spring 43 bears on the poppet.

When orifice differential pressure develops, the upstream pressure is conducted through ports 40b to act on the lower face of piston 44. The poppet is not influenced by differential pressure, because most effective piston surfaces on the poppet are exposed to the same pressure.

Piston 44 does not need sliding seals, because some leakage past the inner and outer cylindrical surfaces of the piston is preferred. The leakage due to radial clearances is small compared with available flow, and the piston moves freely upward under the influence of differential pressure, compressing bias spring 42.

When piston 44 is moving upward between travel limits on the poppet, the poppet may continue downward motion, increasing pressure across a cooperating orifice.

When piston 44 engages abutting shoulder 41a, its upward motion accelerates the poppet upward and continues to apply upward motion to the poppet, as long as the differential pressure lasts.

After the poppet is lifted clear of the cooperating orifice, differential pressure is dropped away, and bore 41d and ports 40b are exposed to upstream pressure. Piston 44 loses lifting ability, but the upward velocity carries piston and poppet some additional upward distance.

At some upward position, all kinetic energy of the moving mass of poppet and piston is converted to potential energy in the compressed springs. Spring 43 is optional but provides more uniform auto-cycling performance over wide fluid flow ranges.

If the lock system described herein engages the poppet at the most upward position, no kinetic energy is lost from holding that position any length of time.

From the most upward position, downward motion begins. The bias to mass ratio of piston 44 is greater than that for the poppet and its bias, and the piston moves down relative to the poppet to engage shoulder 41c, whether the poppet is locked in the upper position or not; and the cycle repeats endlessly unless locks are engaged on the poppet extension rod.

The free piston system forces auto-cycling, even if upstream fluid inertia and resilience are too low to otherwise auto-cycle. Additionally, the free piston system, as explained for FIG. 7, adds power to the poppet excursion to drive electric generator and frequency modulation features. The free piston somewhat alters the profile of the differential pressure wave related to the poppet and orifice pair, forming a variable flow resistance valve. The altered wave shape is not detrimental to the communication function.

Figure 9:
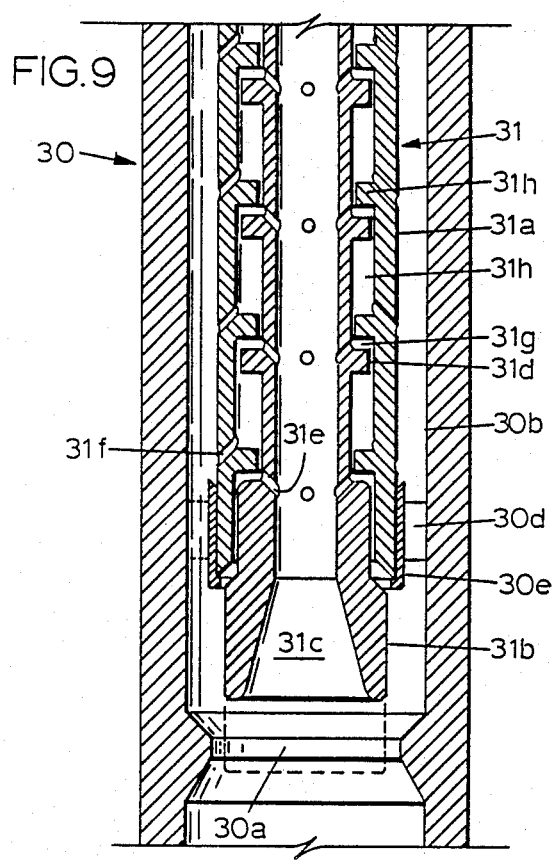
FIG. 9 is a side view, partially cutaway, showing a modification of the pulser of FIG. 6 to extend the flow range of the pulser of FIG. 6 when used in the shuttle format of FIG. 3.

FIG. 9 represents only the lower end of a shuttle and the cooperating orifice. This represents the extreme of poppet diameter and adaptations to allow the apparatus of FIG. 6 to function in a small diameter shuttle, when high flow rates are used.

Body 30 is a part of the drill string according to previous descriptions, with orifice 30a in bore 30b, through which drilling fluid flows. Shuttle 31 is supported in bore 30b by cup baffle 30e, which is attached to body 30 by fins 30d.

Poppet 31b has bore 31c, which conducts fluid through ports 31e to annular cylinders 31g. Fluid above the orifice 30a in bore 30b is admitted through ports 31f to annular cylinders 31h. The plurality of annular cylinders, in tandem, provide enough lift when poppet 31b approaches orifice 30a to start the poppet upward motion. The upper portion of the poppet, extension, and related machinery corresponds to the apparatus of FIG. 6. The plurality of annular cylinders and piston areas do the same thing as annular piston 21e of FIG. 6 without shrinking the poppet bore to such small size, in the slender shuttle, as to reduce cyclic rate by fluid flow restriction.

Figure 10:
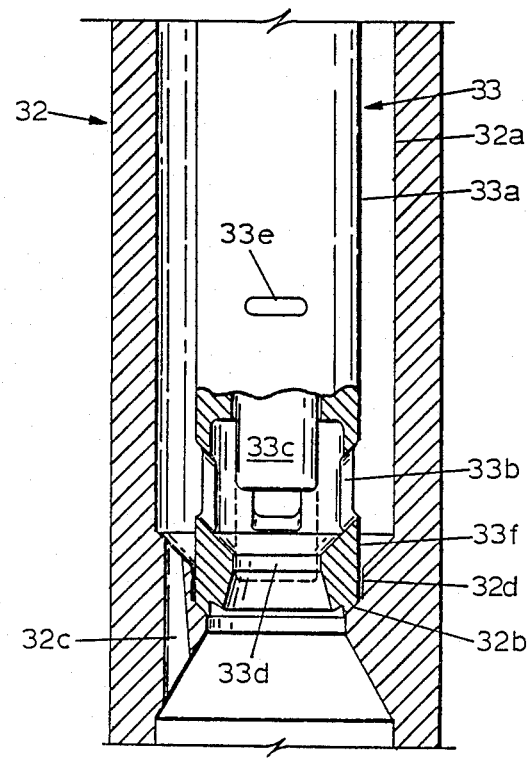
FIG. 10 is a side view, partially cutaway, showing the lower end of the pulser of FIG. 6 for use in the shuttle format of FIG. 3 adapted to low fluid flow applications.

FIG. 10 shows only the lower end of a shuttle housing 33a supported in body 32 on a receiving restriction 32b of bore 32a. Orifice 33d is part of the shuttle. Fluid flows down bore 32a, through ports 33b, and through the orifice 33d. If the drilling fluid flow is too high to be carried through orifice 33d, optional by-pass ports 32c are provided through bore restriction 32b. Poppet 33c and ports 33e correspond to poppet 20h, and ports 20g of FIG. 6 and all other descriptive matter pertaining to function is identical. Body 32 is part of the drill string when assembled.

Guide bore 32d may provide a conventional muleshoe surface. With the muleshoe, if used, a cooperating pin will be used on the outer surface of the shuttle in accordance with current practice.

Figure 12:
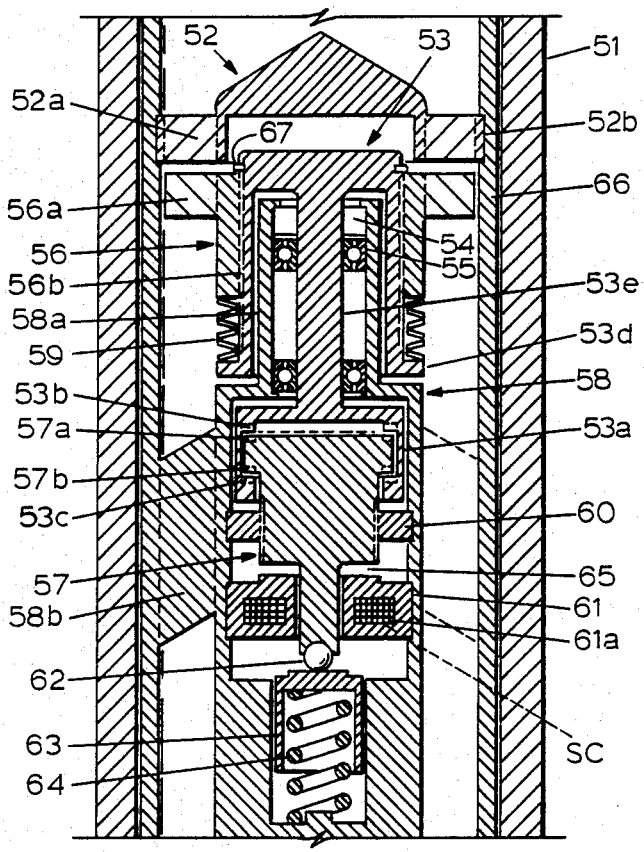
FIG. 12 is a side view, in cutaway, showing features of a turbine powered rotary pulser valve and controls.

The apparatus of FIG. 12 is a rotary pulser valve that will continually auto-cycle to produce a standing pressure wave unless inhibited. Body 51 is part of a drill string as previously described herein. Housing 58 is mounted in the body bore by fins 58b, which connect to compression sleeve stack 66. The compression sleeve stack security has been explained relative to FIG. 4. Stator 52 has radially extending turbine blades shrouded by ring 52b which, in turn, is secured within the compression sleeve stack 66.

Arbor 53 is mounted for rotation on bearings 55 in housing 58. The housing enclosure is sealed by seal 54, which closes the opening between arbor shaft 53e and the bore of housing extension 58a.

Rotor 56 is a sleeve with a bore having internal splines 56b which is slidably situated on arbor skirt 53d, which has mating external axial splines and a lower radial flange. The rotor has radial turbine blades 56a which extend to approach the inner bore of sleeve 66. The rotor is biased upward by springs 59 which rest on the arbor radial flange, and is limited in upward travel by snapring 67.

Arbor 53 has, at the lower end, escapement tub 53a, which has sprocket teeth 53b on the upper inside and sprocket teeth 53c on the lower inside.

Escapement pawl carrier 57 is mounted for limited axial motion and secured against rotation by spline ring 60. Spline ring 60 is secured within the housing and has internal spline teeth slidably mated to external spline teeth on carrier 57. Carrier 57 is biased upward by spring carrier 63 which, in turn, is biased upward by spring 64, which rests on the housing. Upward force is transmitted to carrier 57 by ball 62.

When biased upward, carrier 57 leaves a flux gap 65 betwen the lower face of carrier 57 and solenoid 61.

Solenoid 61 is secured in the housing and has coils 61a powered by any suitable downhole instrument compatible. The wire leads are not shown. When the coil 61a is energized, it pulls carrier 57 downward, overcoming bias 64.

By processes to be shown later, when carrier 57 is in the upward position, pawls 57a engage sprocket teeth 53b and lock the arbor and rotor in one position. When the solenoid pulls carrier 57 downward, pawls and sprockets 57b and 53c are brought into interference before powls and sprockets 57a and 53b are freed of engagement. The single downward stroke of carrier 57 allows arbor 53 and rotor 56 to furn one-half increment. When the solenoid releases carrier 57, it is again biased upward, and pawls and sprockets 57a and sprockets 53b are placed in interference before pawls and sprockets 57b and 53c are freed of engagement. The described escapement cycle—downstroke and upstroke—has allowed the arbor and rotor to turn one increment.

The preferred embodiment has twenty-four stator blades, twenty-four rotor blades, twenty-four teeth on each sprocket, and twenty-four teeth on pawl carrier 57 facing each sprocket. One increment of rotor rotation is fifteen degrees.

As will be shown later, when carrier 57 is biased upward, the rotor blades are in streamline registry below the stator blades. When carrier 57 is pulled downward, the rotor can advance one-half increment and the rotor is in streamline interference with the stator blades. Fluid flows downward between stator blades and rotor blades, and when the blades are stopped in streamline interference, the pressure drop across the rotor increases. The rotor is biased upward and will move downward until the pressure drop is reduced to a preselected level. The rotor and stator blades are shaped to be inefficient when in the streamline interference situation, but the output torque of the rotor is diminished very little by the forced separation from the stator.

The rotor blades provide torque to drive the arbor in rotation. If the solenoid is provided a pulsed current such that carrier 57 reciprocates up and down, the turbine will create in the flowing fluid stream a sympathetic pressure wave in synchronization with the applied solenoid current. If there is no solenoid current, carrier 57 stays in the upward position, and pressure drop through the turbine is minimized. Similarly, if current is constantly applied to the solenoid and carrier 57 is held down, the higher pressure drop through the turbine is held at the preset maximum.

The system described, then, can create communication pressure change for encoding by discrete pulse generation, by time distributed change-of-state, by phase shift, and by frequency modulation, or any combination in accordance with the instrument or signal conditioner providing energy to the solenoid.

Figure 13A:
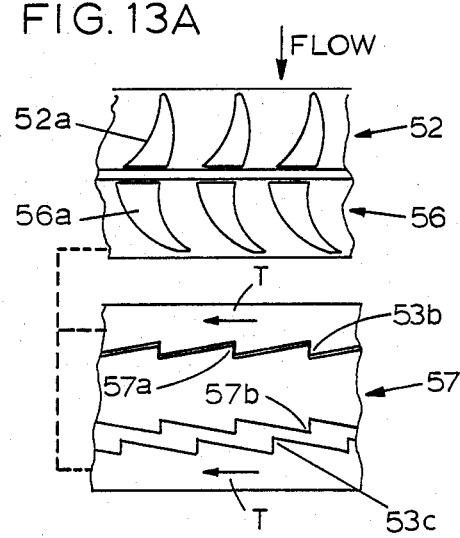
FIGS. 13A and 13B are imaginary surface developments of the apparatus of FIG. 12, showing the relationship of controls and controlled elements.

FIGS. 13A and B more fully describe the turbine rotor and stator relationship and the relationship between the escapement mechanism and the rotor. Consider both views as developments of an imaginary cylindrical surface-cutting sprockets 53b and 53c and pawls 57a and 57b, and a larger cylindrical surface cutting through turbine blades 52a and 56a. Keep in mind that rotor 56 is rotationally attached to the sprockets 53b and 53c. Torque is applied by the rotor in the direction of arrows T.

In FIG. 13A, the pawl carrier is in the normal biased upward position. The pawl carrier is secured against rotation. Pawls 57a engage sprockets 53b. The rotational relationships are such that in any such upward engagement, the rotor turbine blades are stopped in the most streamlined registry with the stator turbine blades.

Sprockets 53b and 53c are one-half increment out of registry. Dimensions are such that the pawls can move downward to free the upper sprockets, but the lower pawls 57b are in position to engage sprockets 53c before the sprockets 53b are free to move left, allowing rotation.

Figure 13B:
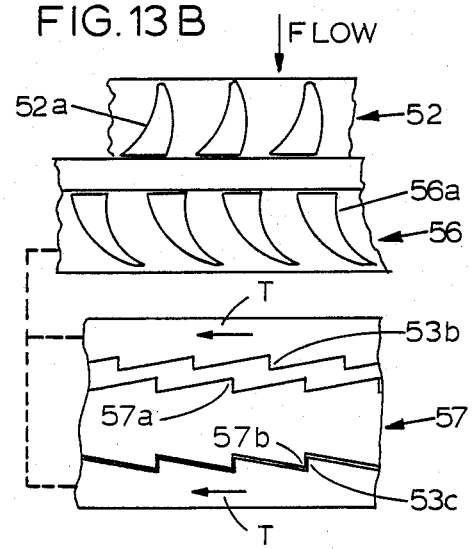

In FIG. 13B, pawls 57a have released sprockets 53b, all sprockets have moved one-half increment left, and sprockets 53c have engaged pawls 57b to stop motion. The rotor has been allowed to move one-half increment, and the rotor blades are in streamline interference with the stator blades. This greatly increases the pressure drop across the turbine rotor, and the rotor has moved down as permitted by preselected bias. It is a peculiarity of turbines that torque produced by the rotor is determined by the total change in peripheral component of fluid velocity coursing through the rotor, and the interference and change in rotor-stator spacing will not greatly change the rotor torque.

Figure 14:
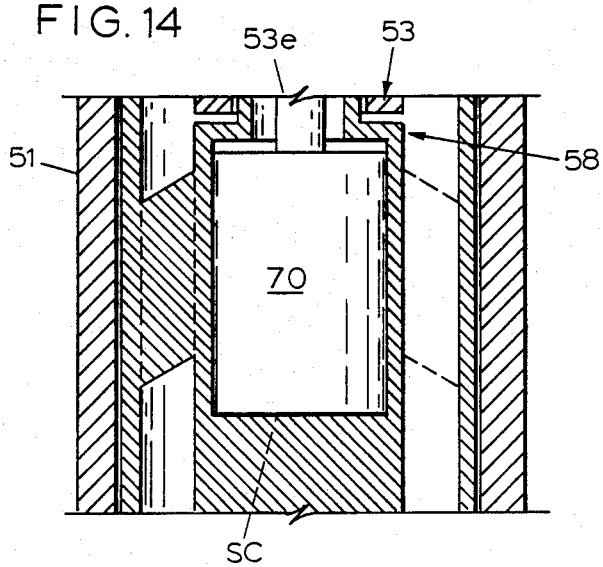
FIG. 14 is a side view, partially cutaway, showing a modification of the apparatus of FIG. 12 for frequency modulation of standing wave fluid pressure signals.

FIG. 14 shows only part of the general apparatus of FIG. 12 fitted with an electric generator 70 in housing 58, attached to and driven by arbor shaft 53e. The housing does not require change. Sprocket tub 53a, splined ring 60, solenoid 61, and pawl carrier 57 is removed. Bias elements 63 and 64 are not needed. Wire leads (not shown) formerly connecting solenoid coil 61a to the signal conditioner, now connect the generator (a permanent magnet alternator) to the signal conditioner.

The arrangement of FIG. 14 is suitable for frequency modulation of the drilling fluid pressure variance standing wave form. The alternator produces an alternating current synchronized with the frequency of the fluid pressure wave generated by the turbine. The turbine speed is inversely proportional to load, and the signal conditioner can control the load. The signal conditioner determines turbine produced fluid pressure pulse frequency and adjusts alternator output load to correct any error and to provide the instantaneous fluid pulse frequency dictated by the encoded message being transmitted.

Alternator load demanded and distributed by the signal conditioner includes battery charging, system power supply, and waste loading.

Figure 15:
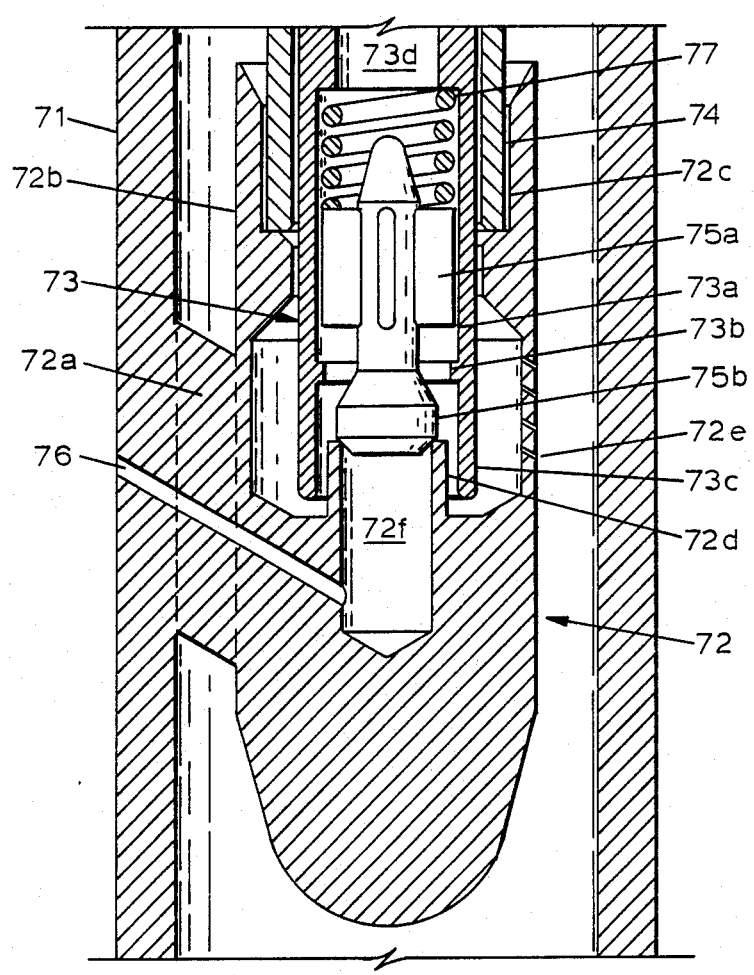
FIGS. 15A and B are side views, partially cutaway, showing the manner of use of the pulser of FIG. 6, modified, in the pulser format of FIG. 3 to create negative pressure pulses or flow resistance changes for communication.
Figure 15:
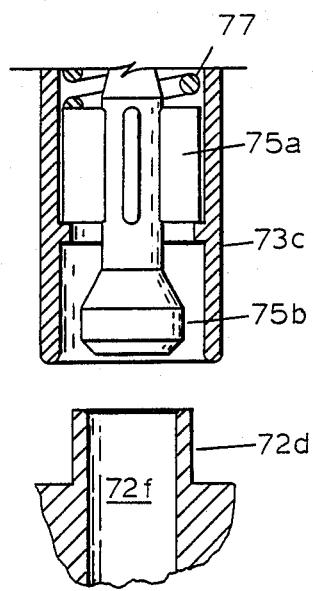

FIG. 15A disclosed the use of the pulser of FIG. 6 for the generation of negative pulses or change of resistance to the flow of drilling fluid by manipulation of by-pass flow. The pulser of FIG. 6 requires modification of the poppet terminal. If used in the shuttle concept in accordance with FIG. 3, the pulser housing must be compatible with the system used to support the shuttle assembly package in the drill string bore.

In FIG. 15A, body 71 is the usual drill string segment. Diverter 72 is suspended in the body bore by three fins 72a. At least one fin has channel 76 extending from bore 72f to conduct available fluid flow to the well bore by-passing flow resistances below such as drill bit jets. The diverter has upwardly opening cup baffle 72b with receiving bore 72c to accept shuttle housing nose 74, when the shuttle is lowered through the drill string bore.

Poppet 73 has bore 73a to guide and confine plug fins 75a. The fins 75a can move axially, thrust down by spring 77, which exerts upward thrust on poppet 73. The fins can move downward limited by bore reduction 73b.

Plug head 75b engages the top of tubular extension 72d to stop flow of fluid into bore 72f.

When the poppet is unlocked from the extreme downward position shown, by processes previously described herein, spring 77 thrusts the poppet upward, because spring 77 is substantially stronger in the extreme downward position of the poppet than the spring (21j of FIG. 6) urging the poppet downward. Inertia of the poppet lifts plug head 75b, when bore reduction 73b engages fins 75a. When plug head 75b lifts from extension 72d, the low pressure outside the drill string is exposed to the poppet bore and is conducted upward through bore 73d to the poppet operating mechanism, and the poppet is accelerated upward as previously described relative to FIG. 6.

Fluid flows through screens 72e from the drill string bore into the bore of extention of 73c and into bore 72f and out channel 76, and a pressure reduction is realized in the drill string bore. The poppet inertia carries the poppet to the position shown in FIG. 15B. This is one change-of-state or one-half pulse. The poppet may be locked in ths position for later release or may return downward under poppet spring bias, becuase in the upper position of FIG. 15B, the pressure in the poppet bore is quite close to that in the drill string.

On the downstroke, plug 75b engages the extension 72d and shuts off flow through bore 72f. Poppet inertia carries the poppet on downward to the position shown in FIG. 15A. This invests energy in spring 77, and if not locked downward, the cycle will repeat.

Energy to continually power the cycle is explained for FIG. 11B and 11C.

The receiving cup 72b may be separated from the diverter structure 72. The advantage of placing the receiving cup some distance upward as a shuttle landing baffle has to do with the ability to dump debris that may collect from the drilling fluid when the shuttle assembly is lifted from the drill string.

A muleshoe may be included in receiving cup 72b. The use of muleshoes to orient shuttles is well established in the art and is not shown.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawings is to be interpreted as illustrative and not in a limiting sense.

The invention having been described, I claim:

1. A fluid flow resistance change signal generator for transmitting signals along a moving fluid column in a drill string bore from a downhole location in a well, the signal generator comprising:
    (a) a body adapted to function as a length of drill string, having means at each end to attach with fluid tight engagement to a continuing drill string, and a drilling fluid channel extending therethrough;
    (b) a resonant signal valve in said body, adapted to change resistance to the flow of drilling fluid in said drilling fluid channel, said signal valve adapted to oscillate between a first position corresponding to less flow resistance and a second position corresponding to more flow resistance in response to fluid flow rate oscillations of fluid flowing in said drilling fluid channel, the movement of said signal valve responsive to bias force arranged to urge said signal valve toward said second position and responsive to piston force arranged to urge said signal valve toward said first position, said piston force produced by a piston operatively connected to move said valve and arranged to respond to fluid pressure differential across said signal valve; and
    (c) restraint means arranged to restrain said signal valve in said first position and to release said valve from said first position in response to signals from a downhole instrument.

2. The signal generator of claim 1 wherein said restraint means is biased to restrain said signal valve in said first position and responsive to a signal from the downhole instrument to release said valve from said first position.

3. The signal generator of claim 1 wherein second position restraint means is provided to restrain said valve in said second position, and to release said signal valve from said second position in response to signals from the downhole instrument.

4. The signal generator of claim 3 wherein said second position restraint means is biased to restrain said signal valve in said second position and responsive to signals from the downhole instrument to release said signal valve from said second position.

5. The signal generator of claim 1 wherein: said signal valve comprises; an orifice, having an upstream side and a downstream side, arranged to accept at least part of the fluid flow in said drilling fluid channel; a poppet supported in said body, arranged to cooperate with said orifice to perform the signal valve flow resistance function, said poppet arranged to oscillate between a first poppet position away from said orifice to provide said first position and a second poppet position near said orifice to provide said second position, said poppet adapted to cooperate with said restraint means, said piston, housed for movement in said body and comprising piston surfaces structurally connected to said poppet; said bias force produced by a spring arranged to act on said poppet.

6. The signal generator of claim 5 wherein said poppet is situated downstream of said orifice such that said piston force results from said poppet being forced from said second position by fluid moving through said orifice against said poppet surfaces.

7. The signal generator of claim 5 wherein: said poppet is situated upstream of said orifice; surfaces in said body comprise a force cylinder arranged to support said poppet for movement toward and away from said orifice, with a valve end of said poppet extending therefrom to cooperate with said orifice; surfaces on a piston end of said poppet comprise a piston arranged to be supported in said force cylinder for movement to and from said poppet first and second positions; said piston having an upstream face and a downstream face; a first channel to provide fluid communication between said drilling fluid channel downstream of said orifice and said upstream face; and a second channel to provide fluid communication between said drilling fluid channel upstream of said orifice and said downstream face.

8. The signal generator of claim 7 wherein said valve end of said poppet is tubular and at least part of said first channel extends therethrough.

9. The signal generator of claim 7 wherein; said piston end of said poppet is fitted with an annular piston confined, for limited axial movement, on said poppet between confining poppet surfaces, a spring arranged to urge said annular piston toward said orifice, said valve end of said poppet being tubular with part of said first channel including the bore of said tubular end of said poppet.

10. The signal generator of claim 5 wherein; said poppet is situated on said downstream side of said orifice; said poppet has a tubular valve end and a piston end; surfaces in said body arranged support said piston end of said poppet with said tubular valve end protruding to cooperate with said orifice; said piston arranged to cooperate with said force cylinder to move said poppet to and from said first and second poppet positions; said piston end of said poppet is fitted with an annular piston, having an upstream face and a downstream face, arranged on said poppet for limited axial movement thereon between confining surfaces on said poppet; surfaces on said poppet comprising a piston with a downstream face and an upstream face; a first channel arranged to communicate fluid between the bore of said tubular end of said poppet and said downstream face on said poppet and said upstream face on said annular piston; a second channel arranged to communicate fluid between said drilling fluid channel downstream of said orifice and said downstream face of said annular piston; said upstream face on said poppet being vented to said drilling fluid channel downstream of said orifice.

11. The signal generator of claim 1 wherein a by-pass fluid channel is arranged to conduct drilling fluid from said drilling fluid channel, through said resonant signal valve, through the wall of said drill string and to the well outside said drill string.

12. The signal generator of claim 11 wherein said upstream face and said downstream face on said piston end of said poppet are on an annular piston mounted on said poppet for limited axial movement thereon between confining surfaces on said poppet and a spring is arranged to urge said annular piston toward said orifice.

13. The signal generator of claim 11 wherein said restraint means is biased to automatically restrain said poppet in at least one of said first and second positions.

14. The signal generator of claim 1 wherein disabler means, responsive to signals from the downhole instrument disables said restraint means to allow said resonant signal valve to produce continuous cyclic pressure changes in said drilling fluid stream.

15. The signal generator of claim 1 wherein brake means, responsive to signals from the downhole instrument, is applied to reduce the rate of said movement of said resonant signal valve to provide a resonant frequency change in the action of said resonant signal valve for frequency change encoding.

16. A signal generator for use downhole on a drill string in a well, to respond to signals from a downhole instrument to transmit fluid pressure change signals along a drilling fluid column, flowing in the bore of the drill string, from a downhole location to the surface, said signal generator comprising:
(a) a body adapted to serve as a length of drill string, having means at each end to attach with fluid tightness to a continuing drill string, and having at least one drilling fluid channel extending therethrough:
(b) a resonant signal valve, in said body, adapted to cooperate with a drilling fluid stream flowing in said drilling fluid channel, at least part of which flows therethrough, to produce mutual oscillations in the flow rate of said drilling fluid stream and in flow resistance related movement of said signal valve, said signal valve to produce time distributed pressure signals in said drilling fluid stream when locked in a position at a point of reversal in oscillatory motion and subsequently released from that position to proceed with said oscillatory motion until again restrained at a point of reversal, said signal valve comprising: an orifice, having an upstream side and a downstream side, situated in said body and arranged to receive at least part of said drilling fluid stream therethrough; a poppet situated on said upstream side of said orifice, having an axis, a valve end and a piston end supported by surfaces in said body arranged to operate, in conjunction with said piston end of said poppet, as a force cylinder with said valve end extending therefrom to cooperate with said orifice to resist said fluid flow therethrough, said poppet arranged to oscillate between a first position away from said orifice and a second position near said orifice in response to bias force arranged to urge said poppet toward said second position and a piston force responsive to pressure differential across said orifice, arranged to urge said poppet toward said first position; said piston force produced by an upstream face and a downstream face on said poppet, in conjunction with fluid channel means adapted to fluidly communicate fluid pressure between said drilling fluid channel, downstream of said orifice, and said upstream face and between said drilling fluid channel, upstream of said orifice, and said downstream face; and a spring arranged to urge said poppet toward said second position;
(c) restraint means, in said body, having means to engage said poppet to restrain said poppet in at least one of said first and said second positions, and to release said poppet in response to signals from said downhole instrument.

17. A signal generator for transmitting pressure change signals, from a downhole location in response signals from a downhole instrument, to the surface, along the bore of a drill string suspended in a well and conducting a drilling fluid stream through the bore, the bore being fitted with a downhole landing baffle, said signal generator comprising:
(a) a body of elongated generally cylindrical shape, having an axis, an upstream end and a downstream end, and being of such outer diameter that said drilling fluid stream continues along an annular channel between the outer surface of said body and the surface of the bore of said drill string; said body adapted to be moved to said downhole location through said bore of said drill string, said downstream end adapted to engage said landing baffle for location; said upstream end adapted to engage body lifting means for recovery from said downhole location;
(b) fluid communication means in said body arranged to open into said annular channel, extend some axial distance in said body and open at said downstream end into said bore of said drill string, said communication means to accept at least part of said drilling fluid stream;
(c) a resonant signal valve in said body, responsive to fluid flow therethrough to oscillate between a more open and a more closed state; said signal valve arranged to resist fluid flow in said communication means to cause coresponding pressure changes in said drilling fluid stream, said signal valve comprising: a valve responsive to bias force to move toward a first position corresponding to more flow resistance, and responsive to a piston force to move toward a second position corresponding to less flow resistance; said piston force produced by a piston housed for movement in said body and connected to said valve for movement therewith; said piston responsive to pressure differential across said signal valve; and a spring in said body to provide said bias force;
(d) restraint means in said body adapted to produce time distributed pressure changes in said drilling fluid stream by suspending the resonant movement of said signal valve at a point of movement reversal to preserve the ability of said signal valve to continue oscillatory movement when said signal valve is released, said restraint means comprising; means to restrain said signal valve in at least one of said two positions and to release said signal valve in response to signals from the downhole instrument.

18. The signal generator of claim 17 wherein said resonant signal valve comprises: an orifice arranged to accept at least part of the fluid flow in said comminication means; a poppet arranged to cooperate with said orifice to serve the valve function; said poppet, situated to reciprocate toward and away from said orifice, biased toward a first poppet position corresponding to said first position; a piston housed for movement in said body, connected to said poppet for movement therewith, said piston having opposed piston surfaces; channel means arranged to fluidly communicate between flow related opposite sides of said orifice, in said communication means, and said opposed piston surfaces such that pressure drop across said orifice provides said piston force to urge said poppet toward a second poppet position corresponding to said second position; said spring arranged to act against said poppet; and means structurally associated with said poppet to cooperate with said restraint means to restrain said poppet in at least one of said two poppet positions.

19. The signal generator of claim 18 wherein: said poppet is housed in said body and arranged to extend from said downstream end to cooperate with said orifice; said orifice is mounted in the bore of said drill string and situated to accept at least part of said drilling fluid stream.

20. The signal generator of claim 18 wherein: said landing baffle is arranged to sealingly engage said downstream end; an opening in said landing baffle provides a continuation of said communication means; and a by-pass fluid channel extends from said opening through the drill string wall to open into the well outside said drill string.

21. The signal generator of claim 19 wherein said orifice is in a by-pass channel extending from the bore of said drill string, through the drill string wall and opening outside said drill string into the well.

22. The signal generator of claim 17 wherein the oscillation of said resonant signal valve is enhanced by delay means such that said piston, in moving said valve from said first position, is allowed some preselected travel independently of said valve before moving said valve, said delay means comprising: a valve to piston linkage arranged to allow a preselected amount of relative movement between said valve and said piston and a spring is provided to urge said piston toward a piston position corresponding to said first position of said resonant signal valve.

23. The signal generator of claim 17 wherein a linear motion electric energy generator is provided in said body and connected, for actuation, with said piston, electric energy produced by said electric energy generator being delivered to said downhole instrument.

* * * * *